(12) United States Patent
Felt

(10) Patent No.: US 9,118,876 B2
(45) Date of Patent: Aug. 25, 2015

(54) AUTOMATIC SKIN TONE CALIBRATION FOR CAMERA IMAGES

(75) Inventor: Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 270 days.

(21) Appl. No.: 13/436,297

(22) Filed: Mar. 30, 2012

(65) Prior Publication Data
US 2013/0258118 A1 Oct. 3, 2013

(51) Int. Cl.
H04N 5/228 (2006.01)
A45D 44/00 (2006.01)
H04N 9/64 (2006.01)
H04N 17/00 (2006.01)

(52) U.S. Cl.
CPC .............. H04N 9/643 (2013.01); A45D 44/005 (2013.01); H04N 17/002 (2013.01)

(58) Field of Classification Search
None
See application file for complete search history.

(56) References Cited

U.S. PATENT DOCUMENTS

| | | | | |
|---|---|---|---|---|
| 6,937,755 B2* | 8/2005 | Orpaz et al. | | 382/162 |
| 7,634,103 B2* | 12/2009 | Rubinstenn et al. | | 382/100 |
| 8,625,023 B2* | 1/2014 | Rolston | | 348/371 |
| 2003/0041871 A1* | 3/2003 | Endo et al. | | 132/301 |
| 2003/0065589 A1* | 4/2003 | Giacchetti | | 705/27 |
| 2003/0235333 A1* | 12/2003 | Lin | | 382/167 |
| 2004/0170337 A1* | 9/2004 | Simon et al. | | 382/254 |
| 2005/0135675 A1* | 6/2005 | Chen et al. | | 382/162 |
| 2005/0163369 A1* | 7/2005 | Jyou et al. | | 382/167 |
| 2006/0197775 A1* | 9/2006 | Neal | | 345/589 |
| 2007/0019882 A1* | 1/2007 | Tanaka et al. | | 382/276 |
| 2007/0047761 A1* | 3/2007 | Wasilunas et al. | | 382/100 |
| 2007/0058858 A1* | 3/2007 | Harville et al. | | 382/165 |
| 2007/0195174 A1* | 8/2007 | Oren | | 348/222.1 |
| 2007/0214180 A1* | 9/2007 | Crawford | | 707/104.1 |
| 2008/0232692 A1* | 9/2008 | Kaku | | 382/190 |
| 2010/0026832 A1* | 2/2010 | Ciuc et al. | | 348/222.1 |
| 2010/0097485 A1* | 4/2010 | Lee et al. | | 348/222.1 |
| 2010/0157084 A1* | 6/2010 | Shimamura et al. | | 348/222.1 |
| 2010/0226531 A1* | 9/2010 | Goto | | 382/103 |
| 2012/0044335 A1* | 2/2012 | Goto | | 348/77 |
| 2012/0147045 A1* | 6/2012 | Oike et al. | | 345/634 |
| 2012/0257000 A1* | 10/2012 | Singhal | | 348/14.02 |
| 2012/0257826 A1* | 10/2012 | Kim et al. | | 382/167 |
| 2013/0021490 A1* | 1/2013 | James et al. | | 348/222.1 |
| 2013/0162862 A1* | 6/2013 | Zhao et al. | | 348/223.1 |
| 2013/0169827 A1* | 7/2013 | Santos et al. | | 348/207.1 |
| 2013/0300761 A1* | 11/2013 | Ahmed | | 345/595 |

* cited by examiner

Primary Examiner — Twyler Haskins
Assistant Examiner — Wesley J Chiu

(57) ABSTRACT

Exemplary image calibration systems and methods are described herein. An exemplary method includes an image calibration system receiving data representative of an input camera image, detecting a face of a person represented in the input camera image, determining a predefined skin tone template associated with the person, and modifying the input camera image to change an appearance of the face of the person based on the predefined skin tone template associated with the person. In certain embodiments, the modification changes one or more skin tones represented by an image of the face of the person in the camera image based on the predefined skin tone template. Corresponding methods and systems are also disclosed.

18 Claims, 11 Drawing Sheets

AUTOMATIC SKIN TONE CALIBRATION FOR CAMERA IMAGES

BACKGROUND INFORMATION

As digital imaging technologies have advanced, digital cameras have become commonplace in modern society. Digital cameras are found in dedicated camera devices (e.g., dedicated video and/or still-shot camera devices), mobile phone devices, smartphone devices, tablet computers, laptop computers, gaming devices, and other computing devices.

The proliferation of digital cameras in modern society has led to digital camera images being captured in numerous different environments having a wide variety of lighting conditions. Because the quality and features of camera images are highly dependent on the lighting conditions in which the camera images are captured, the differences in lighting conditions within which camera images that include a person are captured can result in the person appearing different from one camera image to another. The appearance (e.g., skin tones) of the person in a camera image captured under certain lighting conditions may be preferred over the appearance of the person in another camera image captured under different lighting conditions. To illustrate one example, the skin tones of the face of a person may blend into the shadow tones of a camera image that is captured in dim lighting and/or underexposed. Unfortunately, such results are not uncommon considering that the various lighting conditions in which camera images of a person are captured may not be controllable in all situations and that many digital cameras are programmed to be biased, when operated in an automatic image capture mode, toward erring on the side of underexposing an image in order to avoid white light clipping that may result from overexposing an image.

Because of such differences in the appearance of a person across camera images captured in various lighting conditions, manual editing of digital camera images has become a common practice. However, such manual editing of camera images may require expensive editing tools, proficient image editing skills, tedious labor, and significant amounts of time.

Moreover, for certain uses of camera images, there is insufficient time available for manual editing of the camera images. For example, more and more people use mobile devices to indiscriminately capture and share camera images with one another by way of messages, social networking services, and/or photo sharing services in a way that leaves insufficient time for manual review and/or editing of the camera images before they are shared.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
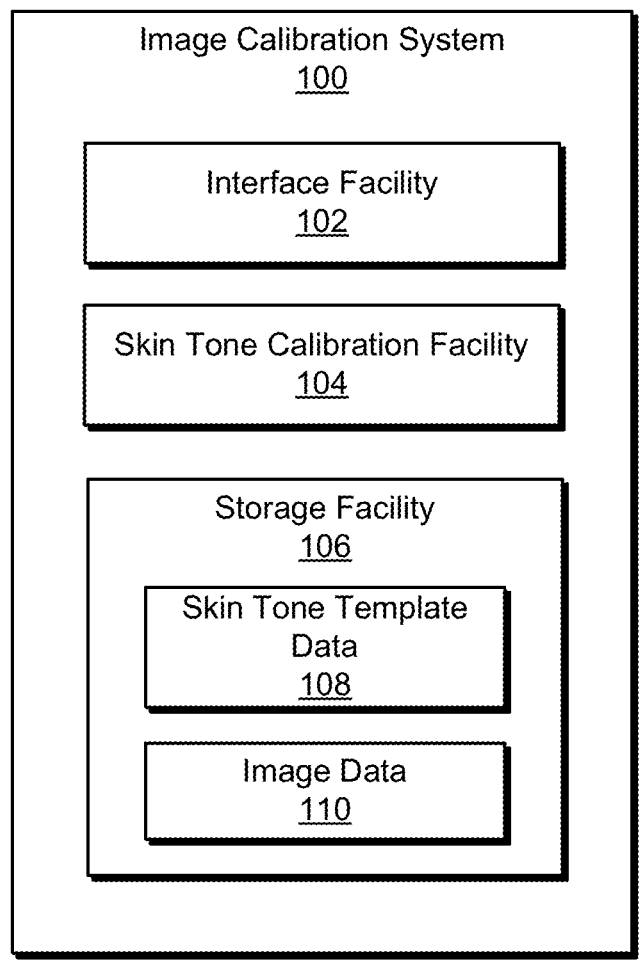
FIG. 1 illustrates an exemplary image calibration system according to principles described herein.

Exemplary skin tone calibration systems and methods are described herein. In certain exemplary systems and methods described herein, a skin tone template for a person may be generated and data representative of the skin tone template may be stored and maintained. The skin tone template may include data that represents one or more preferred image attributes (e.g., one or more preferred skin tone attributes) of the person and may be used by the exemplary systems and methods described herein to automatically calibrate the appearance of the person in one or more camera images. For example, one or more image attributes of the person in a camera image may be modified based on the skin tone template associated with the person to change the appearance of the person (e.g., the appearance of the face of the person) based on the skin tone template. In certain examples, this modification may include modifying one or more skin tone attributes of the face of the person in the camera image based on the skin tone template for the person to move the skin tone attributes of the face of the person toward one or more preferred skin tone attributes of the face of the person specified in the skin tone template. The modification may be performed automatically without human intervention (e.g., without manual editing).

In this or a similar manner, image data in a camera image may be automatically modified based on a predefined skin tone template to produce a resultant camera image in which an appearance of an image of a person included in the camera image has been automatically calibrated in accordance with one or more preferred image attributes specified by the predefined skin tone template. By automatically calibrating the camera image in this manner, the appearance of the person in the camera image may be modified to include one or more preferable image attributes specified by the predefined skin tone template. Such a calibration may improve the appearance of the person in the camera image, even if the un-calibrated camera image was captured in less than ideal lighting conditions. For example, if a camera image was captured in dim lighting and/or was underexposed, the skin tones of the face of a person may be too dark and/or may blend into the shadow tones of the camera image, which may be undesirable. The camera image may be subjected to an automatic calibration process in which the appearance of the skin tones of the face of the person may be modified based on a predefined skin tone template for the person to move the appearance of the face of the person toward one or more preferred image attributes specified by the predefined skin tone template. In some examples, the modification may improve the brightness, color, and/or contrast properties of the image of the face of the person in the camera image. More specific examples of such calibrations of camera images are described herein.

Exemplary systems, methods, and devices associated with skin tone calibration for camera images will now be described in reference to the drawings.

FIG. 1 illustrates an exemplary image calibration system 100 ("system 100"). As shown, system 100 may include, without limitation, an interface facility 102, a skin tone calibration facility 104 ("calibration facility 104"), and a storage facility 106 selectively and communicatively coupled to one another. Any suitable communication technologies may be employed to facilitate communications between facilities 102-106. Each of these facilities will now be described in more detail.

Interface facility 102 may be configured to provide an interface through which system 100 and one or more entities external to system 100 may communicate with one another. Through interface facility 102, system 100 may send and receive communications to/from external entities such as external computing devices, systems, and applications. For example, interface facility 102 may include one or more application program interfaces ("APIs") through which system 100 may communicate with a digital camera. Accordingly, system 100 may receive and/or send data representative of camera images from/to a digital camera (e.g., a digital camera device and/or a digital camera firmware or software application) communicatively coupled to system 100. Additionally or alternatively, system 100 may send data representative of camera images to a display (e.g., a display screen and/or other display device), a social media and/or networking application, an image publishing application, and/or any other computing device, system, and/or application communicatively coupled to system 100 by way of interface facility 102.

Through interface facility 102, system 100 may also receive user input and/or provide user output. For example, interface facility 102 may be configured to receive user input such as a user request to generate a skin tone template for a person, user input for manual editing of a camera image, and/or a user request to calibrate a camera image in accordance with a skin tone template, such as described herein. Additionally or alternatively, interface facility 102 may be configured to provide user output such as a camera image, a graphical user interface ("GUI"), and/or specific elements of a GUI for display to a user, such as described herein.

Calibration facility 104 may be configured to generate data representative of a skin tone template for a person and to calibrate, based on the skin tone template, a camera image that includes an image of the person. For example, calibration facility 104 may use the previously generated skin tone template ("predefined skin tone template") for the person to modify an appearance of the person in a camera image such that the image of the person represented in the camera image exhibits one or more preferred image attributes (e.g., one or more preferred skin tone attributes) specified by the skin tone template.

Storage facility 106 may be configured to store skin tone template data 108 representative of one or more skin tone templates associated with one or more respective people and image data 110 representative of one or more camera images, which may include un-calibrated and/or calibrated camera images. It will be recognized that storage facility 106 may maintain additional or alternative data as may serve a particular application.

Examples of skin tone templates, generating skin tone templates, and calibrating camera images based on skin tone templates will now be described in additional detail.

Figure 2:
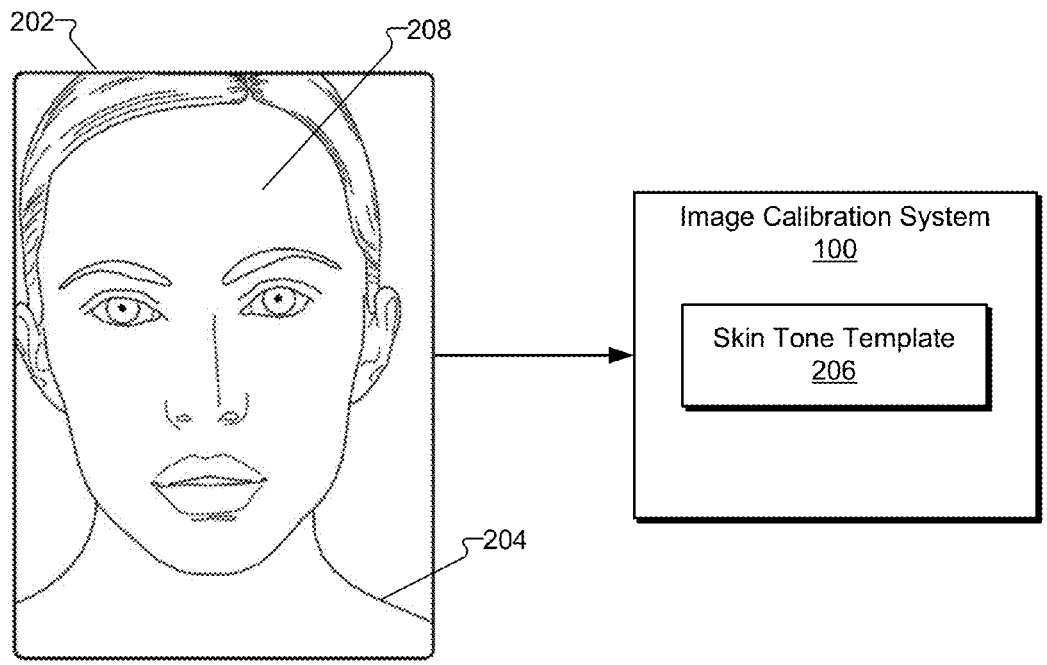
FIG. 2 illustrates an exemplary generation of a skin tone template based on a calibration camera image according to principles described herein.

Calibration facility 104 may be configured to generate a skin tone template in any suitable way. In certain embodiments, for example, calibration facility 104 may generate a skin tone template for a person based on a camera image that includes an image of the person. To illustrate, FIG. 2 shows an example of system 100 receiving data representative of a camera image 202 that includes an image 204 of a person. System 100 may receive camera image 202 from a digital camera, an image management and/or editing application, or another suitable source.

Figure 3:
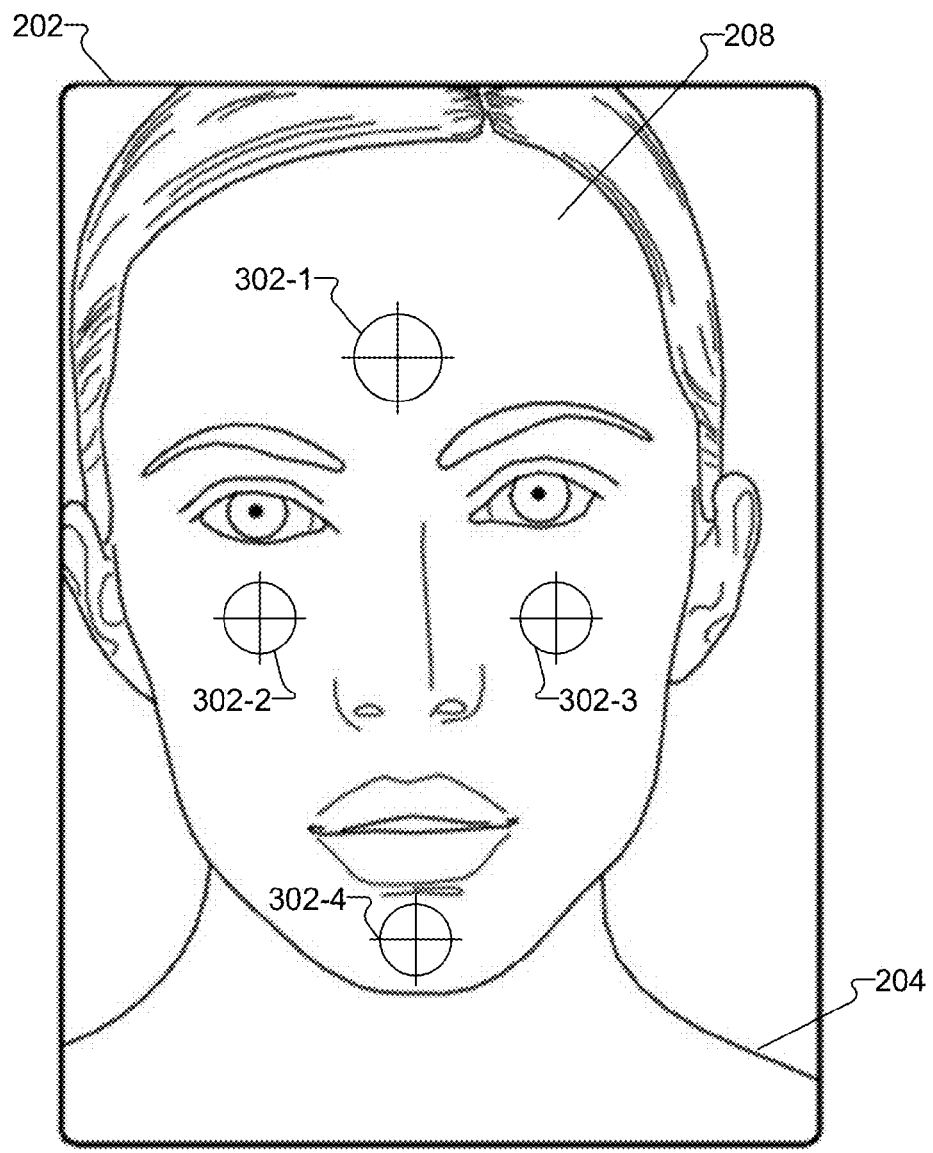
FIG. 3 illustrates exemplary skin tone regions of a face of a person included in a camera image according to principles described herein.

Calibration facility 104 may be configured to use camera image 202 to generate a skin tone template 206 for the person represented in camera image 202. To this end, calibration facility 104 may be configured to analyze camera image 202 and extract information about the content and/or attributes of camera image 202. For example, calibration facility 104 may be configured to utilize one or more image analysis technologies to identify the image 204 of the person represented in camera image 202 and to analyze and/or extract information about one or more regions of camera image 202 that are related to the image 204 of the person. In certain examples, this may include calibration facility 104 identifying, from camera image 202, a face 208 of the person and extracting information about one or more regions of the face 208 of the person. For instance, FIG. 3 shows exemplary skin tone regions 302 (e.g., regions 302-1 through 302-4) of the face 208 of the person represented in camera image 202. In the example illustrated in FIG. 3, the skin tone regions 302 ("regions 302") include a forehead region 302-1, cheek regions 302-2 and 302-3, and a chin region 302-4 of the face 208 of the person represented in camera image 202. Additional and/or alternative skin tone regions may be used in other examples. It will be recognized that the size and shape of each region 302 may vary as may serve a particular implementation.

Calibration facility 104 may be configured to extract any suitable information from camera image 202. For example, calibration facility 104 may extract image data such as values of any pixels included in camera image 202, including values of pixels included in and/or adjacent to regions 302 of the face 208 of the person in camera image 202. The pixel values may indicate image attributes such as color (e.g., RGB values, hue, saturation, etc.), brightness (shadows, midtones, highlights, brightness values within an eight-bit depth range, etc.), contrast, spatial positioning (e.g., matrix coordinates and/or relative positioning), etc. of pixels and/or regions of pixels included in camera image 202. Such image data may represent a set of one or more skin tone attributes of the face 208 of the person as represented in camera image 202.

Figure 4:
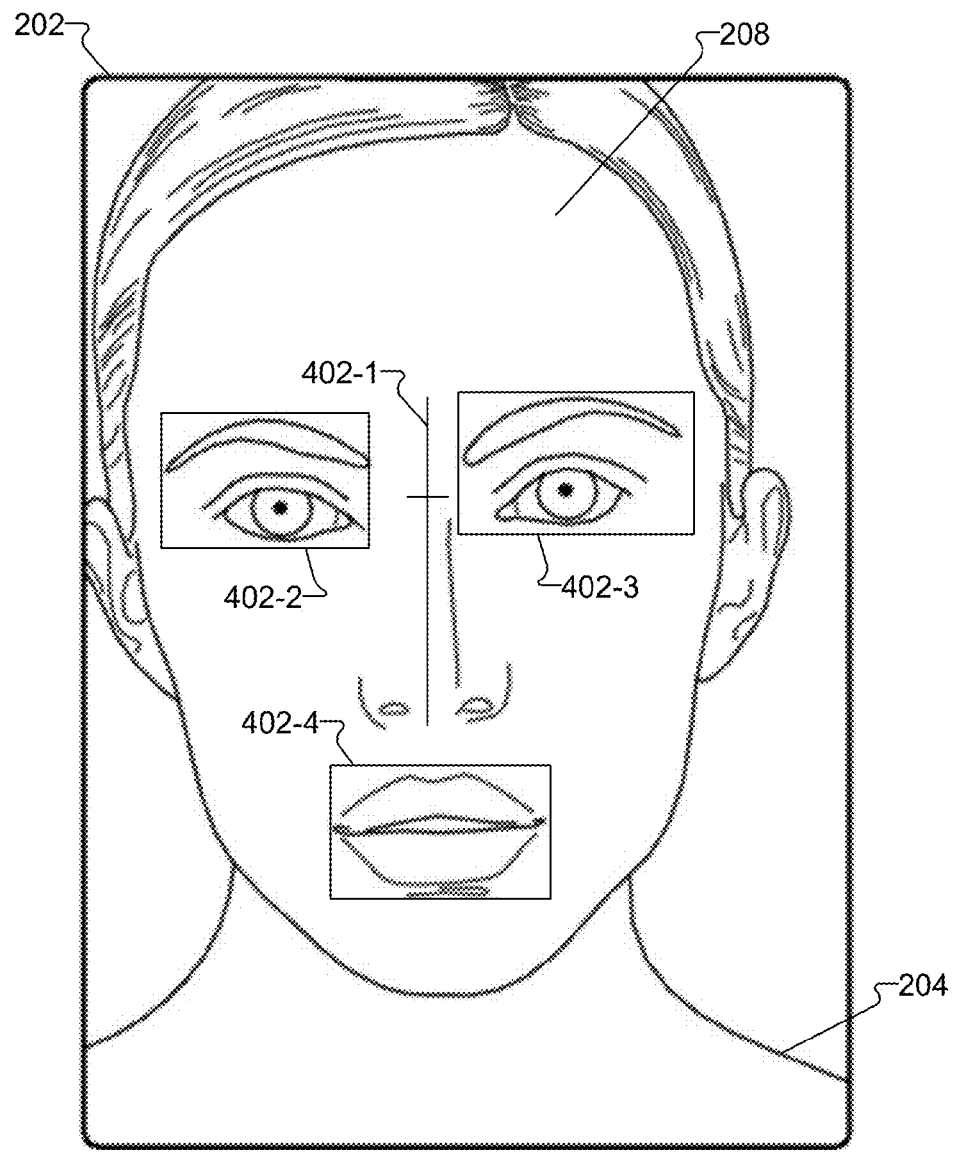
FIG. 4 illustrates exemplary markers indicating facial recognition regions of a face of a person in a camera image according to principles described herein.

As another example, calibration facility 104 may extract image data from camera image 202 that may be useful by calibration facility 104 to perform facial detection and/or recognition operations on camera images. For instance, calibration facility 104 may extract image data from camera image 202 that may be useful to detect images of the person shown in camera image 202 in other camera images. To illustrate, FIG. 4 shows markers 402 (e.g., markers 402-1 through 402-4) indicating facial recognition regions of the face 208 of the person in camera image 202 for which image data (e.g., pixel data) may be extracted for use in facial recognition operations to detect images of the same person in other camera images. In the example illustrated in FIG. 4, markers 402 mark a nose and/or bridge region, eye regions, and a mouth region of the face 208 of the person represented in camera image 202. Additional and/or alternative facial detection and/or recognition regions may be used in other examples.

Any additional and/or alternative image data may be extracted from camera image 202 and used by calibration facility 104 to generate skin tone template 206 for the person represented in camera image 202. A camera image that is used by calibration facility 104 to generate a skin tone template may be referred to as a "calibration camera image."

In certain examples, camera image 202 may be an unedited camera image. For example, camera image 202 may be an unedited camera image (e.g., raw camera image) captured by a digital camera under preferred lighting conditions that allow the digital camera to produce a desirable appearance of the person (e.g., preferred skin tones of the face 208 of the person) when the camera image 202 is captured. For instance, the camera image 202 may be captured under outdoor lighting conditions that produce desirable skin tones of the face 208 of the person represented in the camera image 202.

In certain examples, camera image 202 may be an edited camera image. For example, camera image 202 may be a camera image that has been captured by a digital camera and subjected to manual editing to produce a desirable appearance of the person (e.g., preferred skin tones of the face 208 of the person) represented in camera image 202. For instance, a camera image may be captured under poor lighting conditions that produce undesirably dark skin tones of the face of a person in the camera image. The camera image may be subjected to manual editing to produce camera image 202 that provides a desirable appearance of the person.

In certain embodiments, calibration facility 104 may be configured to provide one or more image editing tools for use by a user of system 100 to manually edit a camera image to produce a desirable appearance of a person in the camera image. In other embodiments, one or more image editing tools that are separate from system 100 may be used by a user to manually edit a captured camera image to produce camera image 202, which may be received and used by calibration facility 104 to generate skin tone template 206.

Figure 5:
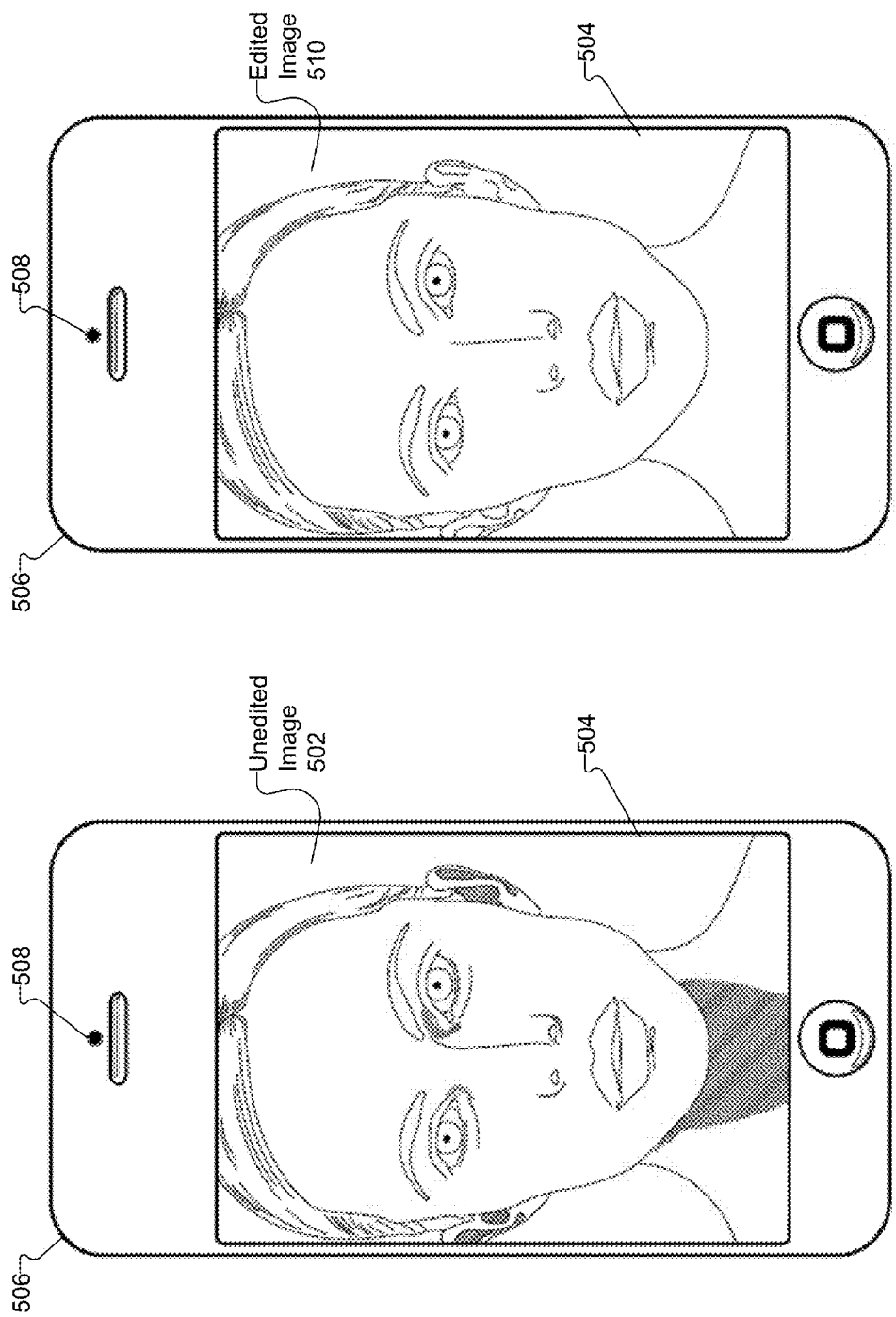
FIG. 5 illustrates an example of unedited and edited versions of a camera image according to principles described herein.

FIG. 5 illustrates an example of an unedited camera image 502 displayed on a display screen 504 of a mobile device 506. Camera image 502 may be captured by a digital camera 508 integrated in mobile device 506 or received by mobile device 506 from an external source (e.g., by way of an email message, a media messaging service ("MMS") message, a social media and/or networking service, the Internet, or other communication and/or network). A user of system 100 implemented at least in part by mobile device 506 may want to manually edit camera image 502 to produce a more desirable appearance of the person represented in camera image 502. The user may utilize any suitable digital image editing tools, including one or more such editing tools provided by calibration facility 104.

Using digital image editing tools, the user may manually modify one or more attributes of camera image 502 to manually change the appearance of the person in camera image 502. For example, FIG. 5 illustrates an edited camera image 510, which is a manually edited version of camera image 502. Attributes of camera image 502, such as color, brightness, and/or contrast attributes, may be manually edited to produce camera image 510 in which the appearance of the person in camera image 510 is more desirable to a user of system 100 than is the appearance of the person in unedited camera image 502. In certain examples, the user may edit camera image 502 to attempt to produce image attributes in camera image 510 that reflect and/or simulate skin tones of the person as they would naturally appear in a camera image captured in preferred lighting conditions such as daylight conditions.

Figure 6:
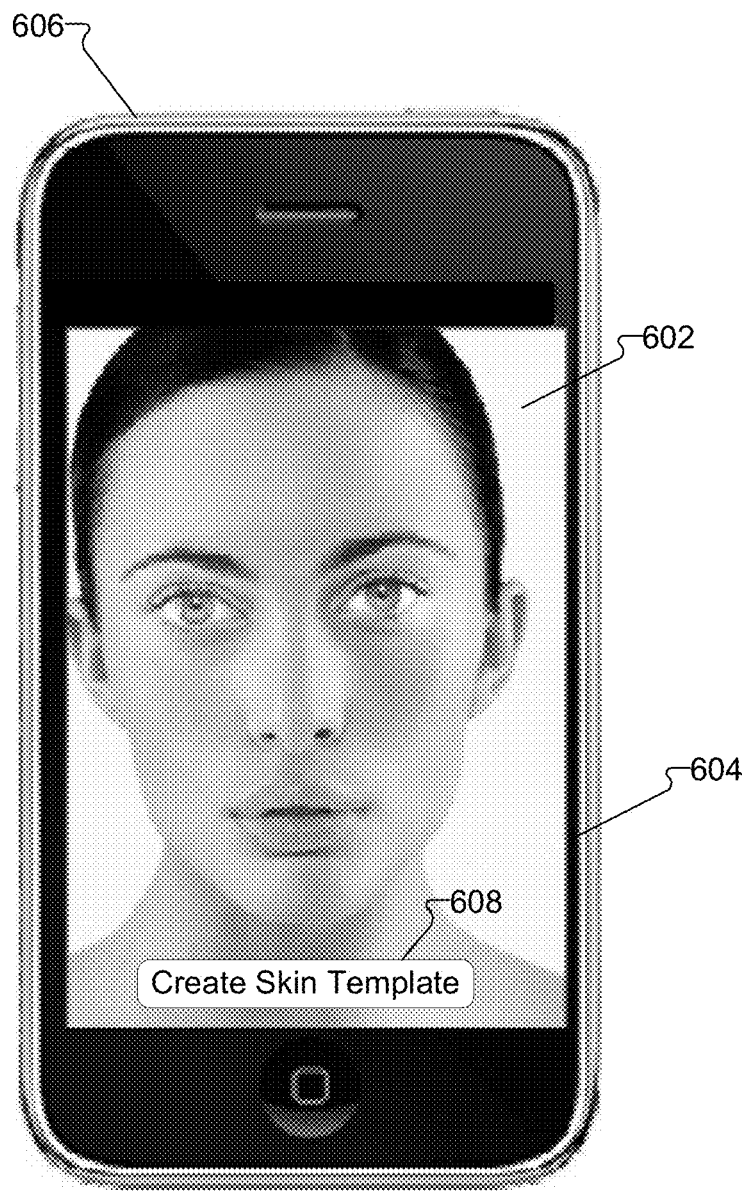
FIG. 6 illustrates a camera image and a user selectable option to create a skin tone template displayed on a display screen according to principles described herein.

In certain embodiments, calibration facility 104 may be configured to generate a skin tone template such as skin tone template 206 in response to a user request to generate a skin tone template. For example, interface facility 102 may receive user input indicating a request to generate a skin tone template based on a particular camera image such as camera image 202 and/or camera image 510. The user input may be provided by a user in any suitable way. To illustrate one example, FIG. 6 shows a camera image 602 displayed on a display screen 604 of a mobile device 606. A user selectable option 608 is also displayed on display screen 604 (e.g., overlaid on camera image 602) and is configured to be selected by a user of mobile device 606 to request that a skin tone template be generated based on the displayed camera image 602. User interface facility 102 may receive a user selection of option 608, and calibration facility 104 may detect the user request and respond by generating a skin tone template based on the camera image 602 as described herein.

A skin tone template, such as skin tone template 206, generated by calibration facility 104 may include any data that may be potentially useful for calibrating a camera image based on the skin tone template. For example, the skin tone template may include image data extracted from a calibration camera image that was used as a basis to generate the skin tone template. The image data may represent a person included in the camera image, a background included in the camera image, and/or any other person, object, and/or scenery included in the camera image. The image data may represent one or more image attributes of the person and/or the person's surroundings in the camera image. For example, the image data may represent image attributes of one or more skin tone regions of the face of a person, such as regions 302 of the face 208 of the person included in camera image 202, as shown in FIG. 3. The image data may also represent image attributes of one or more facial detection and/or recognition regions of the face of a person, such as regions represented by markers 402 in FIG. 4.

Image data included in a skin tone template may include data representative of color, brightness, contrast, spatial positioning, etc. of pixels and/or regions of pixels included in the calibration camera image from which the skin tone template is generated. In certain examples, this data may indicate colors, shadows, midtones, and/or highlights included in the camera image, such as colors, shadows, midtones, and/or highlights of skin tone regions (e.g., regions 302) of the face of a person. In certain examples, this data may indicate tonal ranges and/or tonal distributions (e.g., ranges and/or distributions of pixel brightness) within a skin tone region. Any combination or sub-combination of this data may collectively represent a preferred set of skin features of the person (e.g., one or more preferred skin tones for the person). For example, the image data may represent skin textures, colors, brightness, and/or contrasts that are representative of a preferred skin tone of the person. To illustrate, the image data may indicate certain brightness and contrast values for the face of the person, which values would produce a vivid and/or lively image of the face of the person in a camera image. The skin tone template may further include any information that indicates the person (e.g., an identity of the person) to whom the skin tone template is associated.

Figure 7:
FIG. 7 illustrates an exemplary calibration of a camera image based on a predefined skin tone template according to principles described herein.

After a skin tone template has been generated and stored, the skin tone template is available for use by calibration facility 104 to automatically calibrate one or more camera images based on the skin tone template. To illustrate, FIG. 7 shows system 100 receiving data representative of an input camera image 702 that includes an image 704 of a person. System 100 may receive input camera image 702 from any suitable source, including from a digital camera (e.g., a digital camera device and/or a digital camera firmware or software application) communicatively coupled to system 100, a social media and/or networking service (e.g., from a social contact of the person by way of a social media and/or networking service), a message from a social contact of the person, and/or any computing device, system, and/or application communicatively coupled to system 100.

Calibration facility 104 of system 100 may perform an image calibration process on input camera image 702 to calibrate the camera image 702 based on a predefined skin tone template (which has been generated in any of the ways described herein). The image calibration process may include calibration facility 104 detecting the image 704 of the person represented in camera image 702. The detection may be performed in any suitable way. For example, calibration facility 104 may analyze camera image 702 to detect one or more physical features of the person represented in the camera image 702. This may include detecting a face 706 and/or one or more facial features of the person represented in the camera image 702.

After calibration facility 104 has detected the image 704 of the person in camera image 702, calibration facility 104 may determine whether skin tone template data 108 includes data representative of a skin tone template associated with the same person. This determination may be made in any suitable way. For example, calibration facility 104 may compare one or more attributes of the image 704 of the person in camera image 702 with image attributes specified by a skin tone template to determine whether the skin tone template is associated with the same person represented by the image of the person in camera image 702. In certain examples, this may include comparing attributes of facial recognition regions of the face 706 represented in camera image 702 with image data specified by the skin tone template to determine whether the skin tone template is associated with the same person represented in the camera image 702. Based on the results of such a comparison, calibration facility 104 may identify a skin tone template associated with the person represented in camera image 702. For example, calibration facility 104 may determine that skin tone template 206 shown in FIG. 7 is associated with the person represented in camera image 702.

In certain examples, the determination that skin tone template 206 is associated with the person represented in camera image 702 may be performed by calibration facility 104 using facial recognition technology to identify the person represented in camera image 702, such as by extracting image data for the face of the person from camera image 702 and inputting the image data to a facial recognition process to identify the person based on the face of the person represented in camera image 702. The calibration facility 104 may then identify skin tone template 206 as being associated with the same person based on the identification of the person.

Calibration facility 104 may use the identified skin tone template 206 for the person to calibrate input camera image 702. The calibration may include modifying one or more image attributes of camera image 702 based on skin tone template 206 to produce a resultant, calibrated camera image 708 that is a modified version of input camera image 702.

The image calibration may modify, based on skin tone template 206 associated with the person represented in input camera image 702, one or more image attributes of camera image 702 in any way that changes the appearance of the image 704 of the person in the resultant, calibrated camera image 708. For example, the calibration process may modify image data representative of the face 706 of the person in camera image 702 based on skin tone template 206 such that the appearance of the face 706 in calibrated camera image 708 includes one or more preferred image attributes specified by the skin tone template 206. Specifically, in some examples, the skin tone of the face 706 of the person as represented in input camera image 702 may be modified to match a skin tone for the person as specified by skin tone template 206.

In certain examples, the calibration may include calibration facility 104 determining a tonal distribution contained in input camera image 702, determining a tonal distribution specified by skin tone template 206, and modifying the tonal distribution contained in input camera image 702 in a way that moves the tonal distribution contained in input camera image 702 towards the tonal distribution specified by skin tone template 206.

To illustrate, skin tone template 206 may specify a preferred tonal distribution for the face of the person associated with skin tone template 206. Calibration facility 104 may determine, from input camera image 702, a tonal distribution for the face 706 of the person represented in input camera image 702 and compare the tonal distribution of the face 706 of the person represented in input camera image 702 to the preferred tonal distribution specified by skin tone template 206. From this, calibration facility 104 may determine how to modify input camera image 702 to generate calibrated camera image 708 that includes a modified tonal distribution that matches, or is at least closer to the preferred tonal distribution specified by skin tone template 206. The modification of the tonal distribution may modify the appearance of the skin tones of the person in calibrated image 708 to match or be closer to preferred skin tones specified by skin tone template 206.

As an example, skin tone template 206 may specify preferred brightness attributes for the face of the person associated with skin tone template 206 (e.g., brightness values of pixels representing the face of the person). Input camera image 702 may have been captured in lighting conditions that produced brightness attributes for the face of the person that are generally darker than the preferred brightness attributes. During a calibration process, calibration facility 104 may detect this and modify input camera image 702 to brighten one or more brightness attributes of the input camera image 702 to match or at least be closer to the preferred brightness attributes specified by skin tone template 206. For instance, based on differences of brightness attributes in input camera image 702 and skin tone template 206, calibration facility 104 may modify input camera image 702 by increasing the brightness values of pixels included in input camera image 702 (e.g., by a certain percentage, by a shift offset, pixel-by-pixel to match brightness values specified by skin tone template 206, or in any other suitable way) to change the appearance of the person as represented in the resultant, calibrated camera image 708.

As another example, skin tone template 206 may specify a preferred tonal range for the face of the person associated with skin tone template 206. Input camera image 702 may have been captured in lighting conditions that produced a tonal range for the face of the person that is broader or narrower in scope than the preferred tonal range. Accordingly, the input camera image 702 may include more or less contrast in the face of the person than is preferred. Calibration facility 104 may detect this and modify input camera image 702 to narrow or broaden the tonal range of the face of the person to match or at least be closer to the preferred tonal range specified by skin tone template 206. For instance, based on differences of tonal ranges in input camera image 702 and skin tone template 206, calibration facility 104 may modify input camera image 702 by increasing and/or decreasing the brightness values of select pixels included in input camera image 702 (e.g., by a certain percentage, by a shift offset, or in any other suitable way) to narrow or broaden the tonal range of the face of the person as represented in the resultant, calibrated camera image 708. By narrowing the tonal range, calibration facility 104 may smooth out the level of contrast in the face 706 of the person, which may help to make facial features such as wrinkles or blemishes less noticeable. By broadening the tonal range, calibration facility 104 may increase the contrast in the face 706 of the person, which may help make certain facial features more noticeable.

To illustrate a specific example, input camera image 702 may be captured in dim lighting conditions that produce a dull, dimly lit appearance of the face 706 of the person represented in camera image 702. This type of appearance may be undesirable to the person and/or a user of system 100. For example, the skin tones of the face of the person may appear darker than they would in brighter lighting conditions (e.g., daylight conditions) and/or may blend in with shadow tones of the camera image 702. These effects may be undesirably enhanced if the camera image 702 represents a person who has naturally dark skin tones.

When such an input camera image 702 is subjected to a calibration process as described herein, calibration facility 104 may calibrate the camera image 702 based on skin tone template 206 by automatically modifying one or more image attributes to increase brightness values and thereby brighten the skin tone of the person in the resultant, calibration camera image 708.

Figure 8:
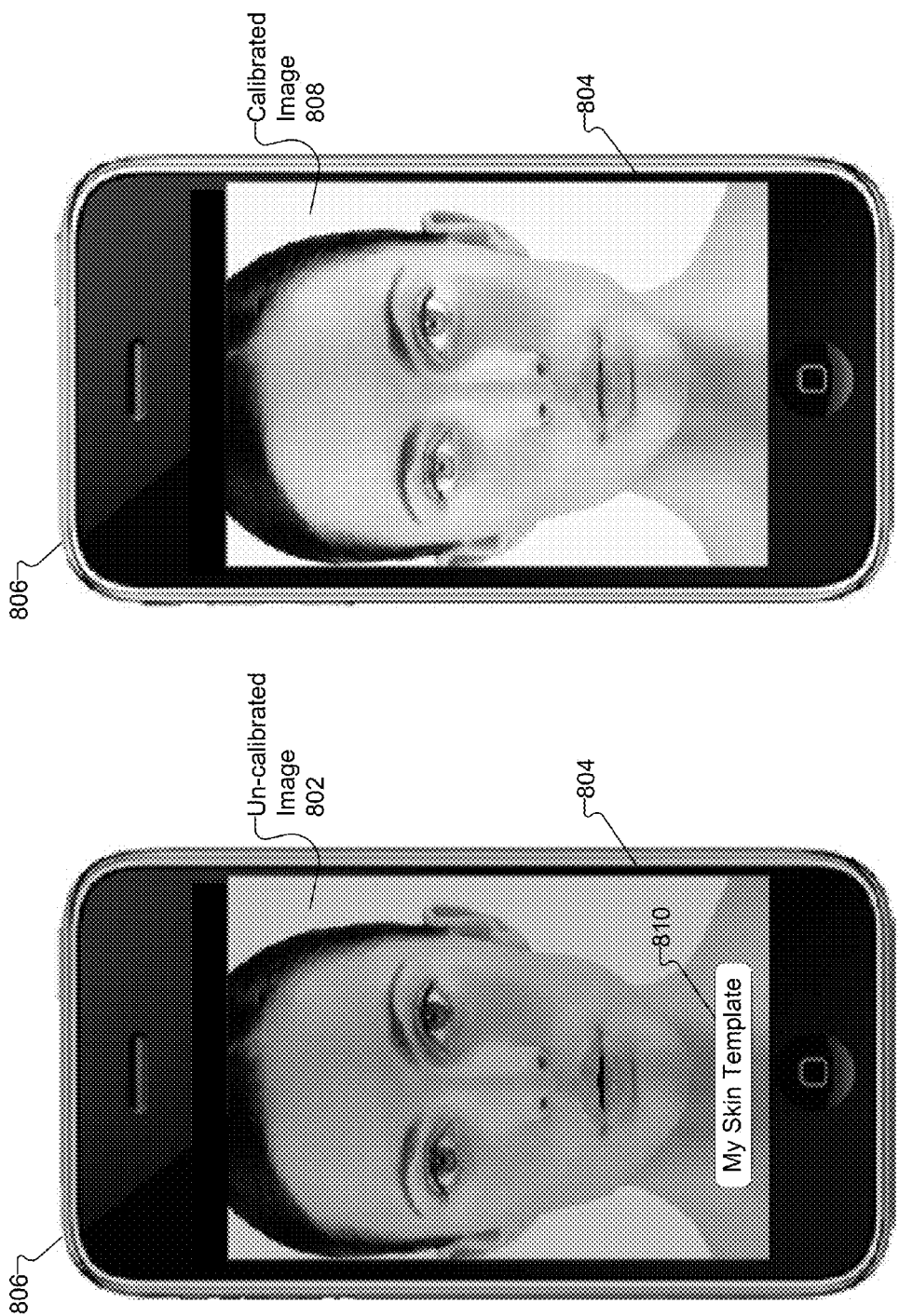
FIG. 8 illustrates an example of un-calibrated and calibrated versions of a camera image according to principles described herein.

FIG. 8 illustrates an example of un-calibrated and calibrated versions of a camera image. As shown, an un-calibrated input camera image 802 may be displayed on a display screen 804 of a mobile device 806. The image of face of the person represented in camera image 802 may have skin tones that are generally darker than skin tones specified by a skin tone template associated with the person. Calibration facility 104 may calibrate camera image 802, such as described herein, to produce calibrated image 808, which is also shown displayed on display screen 804 of mobile device 806 in FIG. 8. As shown, the appearance of the face of the person represented in calibrated camera image 808 may have skin tones that are generally brighter than the skin tones of the face of the person represented in un-calibrated camera image 802.

The skin tones of the person in camera image 808 may be preferable over the skin tones of the person in camera image 802 based on the definition of one or more preferred skin tone attributes in the skin tone template associated with the person. Accordingly, the calibrated camera image 808 visually represents skin tones of the person that align with the preferences of the person and/or the preferences of a different user of system 100 (e.g., a photographer, an acquaintance of the person, etc.).

The above-described examples of modifying one or more image attributes of a camera image based on a predefined skin tone template are illustrative only. Calibration facility 104 may be configured to modify one or more image attributes of a camera image based on a predefined skin tone template in additional and/or alternative ways in other examples. For instance, calibration facility 104 may modify pixel values such as brightness, contrast, and/or color values of pixels included in the camera image, which modification may be configured to change the appearance of a person represented in the camera image to match or to move toward exhibiting preferred image attributes specified by the skin tone template. Such modifications may include modifying combinations of pixel values (e.g., by modifying a combination of color and brightness values of one or more pixels).

Calibration facility 104 may apply modifications to a camera image as a whole or to specific regions of a camera image. As an example, calibration facility 104 may modify a camera image by increasing the brightness values of all pixels in the camera image (e.g., by a select value such as by twenty percent) to change the skin tones of a person represented in the camera image to match skin tones specified by a skin tone template associated with the person. As another example, calibration facility 104 may modify a camera image by increasing the brightness values of only the pixels included in an image of the face of a person represented in the camera image. Other regions of the camera image, such as regions surrounding or adjacent to the face of the person, may be unchanged or modified in a complimentary way (e.g., by leaving the brightness levels of these regions unchanged or decreasing the brightness levels of these regions to enhance the contrast between these regions and the face of the person). In certain examples, each separate skin tone region (e.g., each skin tone region 302) of the face of the person represented in the camera image may be processed (e.g., modified) individually such that regions may be modified differently by a calibration process.

By being able to apply a modification to a specific region within a camera image, calibration facility 104 may be able to calibrate a camera image that includes images of multiple people. For example, a camera image may include images of two people. When calibration facility 104 subjects the camera image to a calibration process, calibration facility 104 may determine that system 100 has access to a predefined skin tone template for one person represented in the camera image but not for the other person represented in the camera image. Calibration facility 104 may modify the camera image to change the appearance of the first person based on the associated skin tone template. This modification may be performed without substantially changing the appearance of the second person represented in the camera image. For instance, values of pixels included in a region representing the face of the first person may be modified, and values of pixels included in a different region representing the face of the second person may be left unchanged.

As another example, a camera image may include images of two people. When calibration facility 104 subjects the camera image to a calibration process, calibration facility 104 may determine that system 100 has access to a first predefined skin tone template for the first person represented in the camera image and a second predefined skin tone template for the second person represented in the camera image. Calibration facility 104 may modify the camera image to change the appearance of the first person based on the first skin tone template associated with the first person and the appearance of the second person based on the second skin tone template associated with the second person.

Calibration facility 104 may be configured to subject a camera image to a calibration process in response to any predefined trigger event. As an example, calibration facility 104 may be configured to subject a camera image to a calibration process in response to system 100 receiving data representative of the camera image from a source, such as described herein. As another example, calibration facility 104 may be configured to subject a camera image to a calibration process in response to system 100 receiving a request and/or initiating a process to publish and/or send the camera image to an entity external of system 100 (e.g., to a social media and/or networking service, an image publishing application, a messaging service, a messaging destination, a social contact, etc.).

As another example, calibration facility 104 may be configured to subject a camera image to a calibration process in response to receipt of user input requesting that the camera image be calibrated. The user input may be provided by a user in any suitable way. To illustrate one example, FIG. 8 shows a user selectable option 810 displayed together with (e.g., overlaid on) un-calibrated camera image 802 on display screen 804 of a mobile device 806. User selectable option 808 may be configured to be selected by a user of mobile device 806 to request that camera image 802 be subjected to a calibration process. User interface facility 102 may receive a user selection of option 808, and calibration facility 104 may detect the user request and respond by calibrating camera image 802 based on a skin tone template in any of the ways described herein. The calibration process may then be performed by calibration facility 104 without any intervention or additional user input from a user such that the camera image is automatically calibrated based on a skin tone template.

System 100 may be implemented for a variety of applications and/or uses. Examples of specific implementations of system 100 will now be described.

In certain implementations, system 100 may be implemented by a personal computing device such as a mobile camera device (e.g., a mobile phone that has an integrated digital camera). With system 100 implemented by the mobile camera device, the mobile camera device may be configured to subject a camera image, such as a camera image captured by the mobile camera device, to a calibration process in response to any predetermined event to calibrate the image as described herein. For example, in response to a capture of a camera image, the mobile camera device may analyze the camera image to detect an image of a person within the mobile camera, determine whether a predefined skin tone template for the person is accessible, and, if a skin tone template for the person is accessible, modify the camera image as described herein to change an appearance of the person based on the skin tone template for the person.

Alternatively, the calibration process may be performed on the camera image in response to an occurrence of another predetermined event, such as a detection of user input requesting that the camera image be calibrated, a request to share, publish, or otherwise send the camera image from the mobile camera device to an external device, user, application, and/or service. Accordingly, if a user of the mobile camera device captures, shares, publishes, sends, and/or otherwise processes a camera image that represents a person (e.g., the user), the mobile camera device may automatically calibrate the camera image to change the appearance of the person in the camera image based on a predefined skin tone template associated with the person. The calibration may be performed before the camera image is actually shared, published, or sent such that the appearance of the person in the camera image is aligned with preferences specified in the skin tone template for the person.

In certain implementations, system 100 may be implemented by one or more server devices. With system 100 implemented by a server device, the server device may be configured to subject a camera image, such as a camera image uploaded to or otherwise received by the server device, to a calibration process in response to any predetermined event to calibrate the image as described herein. The predetermined event may include the receipt of the camera image, a request to calibrate the camera image, and/or any other suitable event.

In certain implementations, system 100 may be implemented in a distributed manner across a client computing device (e.g., a mobile camera device) and one or more server devices. Accordingly, the client computing device and/or the server devices may perform the calibration process described herein in a distributed manner.

In certain implementations, system 100 may be implemented as part of a service. For example, one or more computing devices that provide a social media service (e.g., an online social media and/or networking service) may be configured to perform a calibration process on a camera image associated with the service. For example, a user of the service may create a skin tone template as described herein and upload the skin tone template to the service. Thereafter, when a camera image that includes an image of the user is uploaded to the service (e.g., by the user or by another user of the service), the service may perform the calibration process on the camera image as described herein to change the appearance of the user in the camera image before the camera image is published by the service.

In certain implementations, system 100 may be implemented in a way that is configured to support sharing of skin tone templates between users. For example, a first user of a first personal computing device that implements system 100 may create a skin tone template for the first user such that the first personal computing device is configured to use the skin tone template to calibrate a camera image that includes an image of the first user, as described herein. The first user may want the skin tone template to be used by a second user (e.g., a friend of the first user). To this end, the first user may provide the skin tone template for the first user to the second user, such as by instructing the first personal computing device operated by the first user to send data representative of the skin tone template for the first user to a second personal computing device associated with the second user. The second personal computing device may implement system 100 and be configured to receive and use the skin tone template for the first user to calibrate a camera image that includes an image of the first user. For instance, the second personal computing device may comprise a mobile camera device that the second user uses to capture a photo of the first user. The mobile camera device may calibrate the photo to change the appearance of the first user in the photo based on the skin tone template for the first user, as described herein.

In certain implementations, system 100 may be implemented for use by a photographer (e.g., an amateur or a professional photographer). For example, the photographer may create a skin tone template for a customer of the photographer in any of the ways described herein. The skin tone template for the customer is then available for use by a computing device that implements system 100 and is associated with the photographer. Accordingly, the computing device may automatically calibrate camera images that include an image of the customer based on the skin tone template for the customer, as described herein. Such automatic calibration may save the photographer time and eliminate or reduce work that would have otherwise been spent by the photographer to manual edit the camera images. This may allow the photographer to manually edit a first camera image that represents a customer, use system 100 to create a skin tone template for the customer based on the edited camera image, and to automatically calibrate one or more other camera images that represent the customer based on the skin tone template.

In certain implementations, system 100 may be implemented as part of and/or for use by a digital mirror application. For example, a mobile device having an integrated video camera and display screen may implement a mirror application that may instruct the mobile device to display video camera images captured by the video camera on the display screen in real time. The display of the video camera images may simulate a mirror such that when a user of the device is in the field of view of the video camera, a real time video camera image of the user is displayed on the display screen. The mirror application may utilize system 100 in order to display video camera images that have been calibrated based on a predefined skin tone template as described herein.

To illustrate, the video camera may capture video that includes an image of a user of the mobile device. The video may be captured in dim lighting and consequently the image of the user may be dimmer and/or duller than desired by the user. Before the video is displayed on the display screen of the mobile device, system 100 may subject the video to a calibration process, which process may modify the video based on a predefined skin tone template associated with the user to change the appearance of the user based on the skin tone template, as described herein. When displayed, the calibrated video provides an appearance of the user that is more in line with a preferred appearance of the user specified by the skin tone template. For example, the image of the user in the displayed video may be brighter such that the face of the user is more clear, visible, and/or vivid in comparison to the face of the person as it would appear in the un-calibrated video captured in dim lighting conditions.

By automatically calibrating the video before display, the mirror application may display calibrated video that provides an image of a user that exhibits preferred skin tones of the user. Accordingly, the mirror application may simulate the appearance of preferred skin tones of the user irrespective of differences in the lighting conditions in which the video is captured. For example, the user's skin tone template may specify a skin tone as the skin tone would appear in outdoor lighting conditions. The video of the user may be captured in relatively dimmer indoor lighting conditions. System 100 may calibrate the skin tone based on the user's skin tone template to produce and display calibrated video in which the image of the user has a skin tone that matches the preferred skin tone as the skin tone would appear in outdoor lighting conditions.

A user may utilize the mirror application to apply makeup to the face of the user. Because the video displayed by the mirror application is calibrated as described herein, the user may be able to consistently do her makeup in a manner that is pleasing to the user even when the user applies makeup in non-ideal lighting conditions. For example, the user may apply makeup to her face indoors in indoor lighting conditions. The mirror application may allow the user to see how her makeup will look in preferred lighting conditions such as outdoor lighting conditions, which may help the user to avoid being fooled by the indoor lighting conditions into applying makeup that will not look good when the user moves outdoors.

The mirror application may be configured to simulate different lighting conditions. For example, the mirror application may simulate daylight, indoor, and/or fluorescent lighting conditions so that the user is able to view her face as it will appear in the different lighting conditions. To illustrate, a performer may apply her makeup in a dressing room having indoor lighting. The performer may want to see how her makeup will look in fluorescent lighting conditions before going onstage. The performer may utilize the mirror application to simulate fluorescent lighting conditions in order to see how her makeup will look in those conditions. The mirror application may be configured to switch between simulations of different lighting conditions in response to user input.

In certain examples, the mirror application may be configured to provide one or more makeup guide tools. For example, the mirror application may be configured to display a makeup guide template onscreen together with the displayed mirror video content. To illustrate, the mirror application may be configured to use a previous image of a face of a user to generate and display a makeup guide template overlaid on displayed mirror video content to provide the user with a makeup guide template configured to guide the user in application of makeup. For instance, the skin tone template for the user may include image data that represents the user's preferred eyebrow makeup as it appeared in a calibration image from which the skin tone template was generated. A makeup guide template representing the eyebrow makeup from the calibration image may be overlaid on the live image of the face of the user included in the mirror video content to provide a visual aid in the application of the eyebrow makeup to match the eyebrow makeup as it appeared in the calibration image. The mirror application may be configured to appropriate position and overlay the makeup guide template based on one or more detected features of the face (e.g., the outline of the face) of the user in the live mirror video content.

The mirror application may be configured to focus the face of the user within the display screen. For example, the mirror application may detect the image of the face in the captured video and to focus the image of the face at the center of the display screen in a way that helps maximize screen space and/or differentiates the image of the face from the background of the video image. This may help eliminate video display offsets that may be introduced by an integrated camera being offset relative to a display screen of a mobile camera device.

The mirror application may be configured to provide video content displayed at various magnification levels. For example, the mirror application may allow the user to provide input to select a particular magnification at which the video content will be displayed.

The calibration process described herein may be applied to calibrate any suitable image data. For example, system 100 may calibrate image data included in still-shot images (e.g., still-shot photographs), video content, video frames, etc. In some examples, the calibration may be applied in real time with the capture of the image data.

In certain examples, system 100 may provide one or more tools configured for use by a user to toggle a display view between un-calibrated and calibrated versions of a camera image. For example, system 100 may provide an option configured to be selected by a user to switch between un-calibrated and calibrated views of a camera image on a display screen.

In certain embodiments, system 100 may be configured to mark a camera image to indicate that the camera image has been calibrated by system 100. The camera image may be marked in any suitable way, such as by inserting a marker in the metadata and/or the image data of the camera image. In some examples, the mark may specify any skin tone templates that have been used to calibrate the image. To this end, a skin tone template for a user may be assigned a unique identifier. System 100 may insert the unique identified into metadata and/or image data for a camera image to indicate the particular skin tone template that was used to calibrate the camera image. System 100 may use the mark to determine a calibration history of a camera image, to avoid unnecessarily repeating calibration operations on the camera image, and/or to reverse a calibration of the camera image to generate the un-calibrated version of the camera image.

Figure 9:
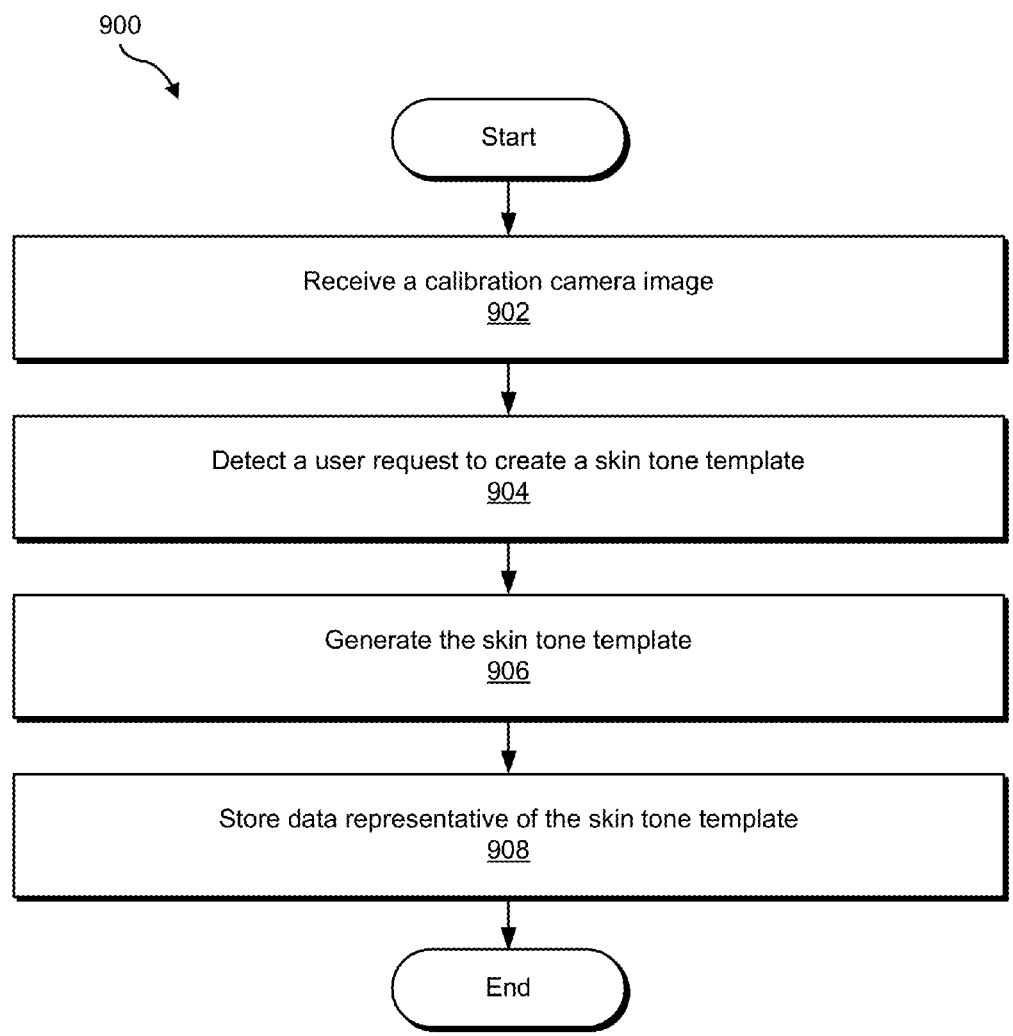
FIGS. 9-10 illustrate exemplary image calibration methods according to principles described herein.
Figure 10:
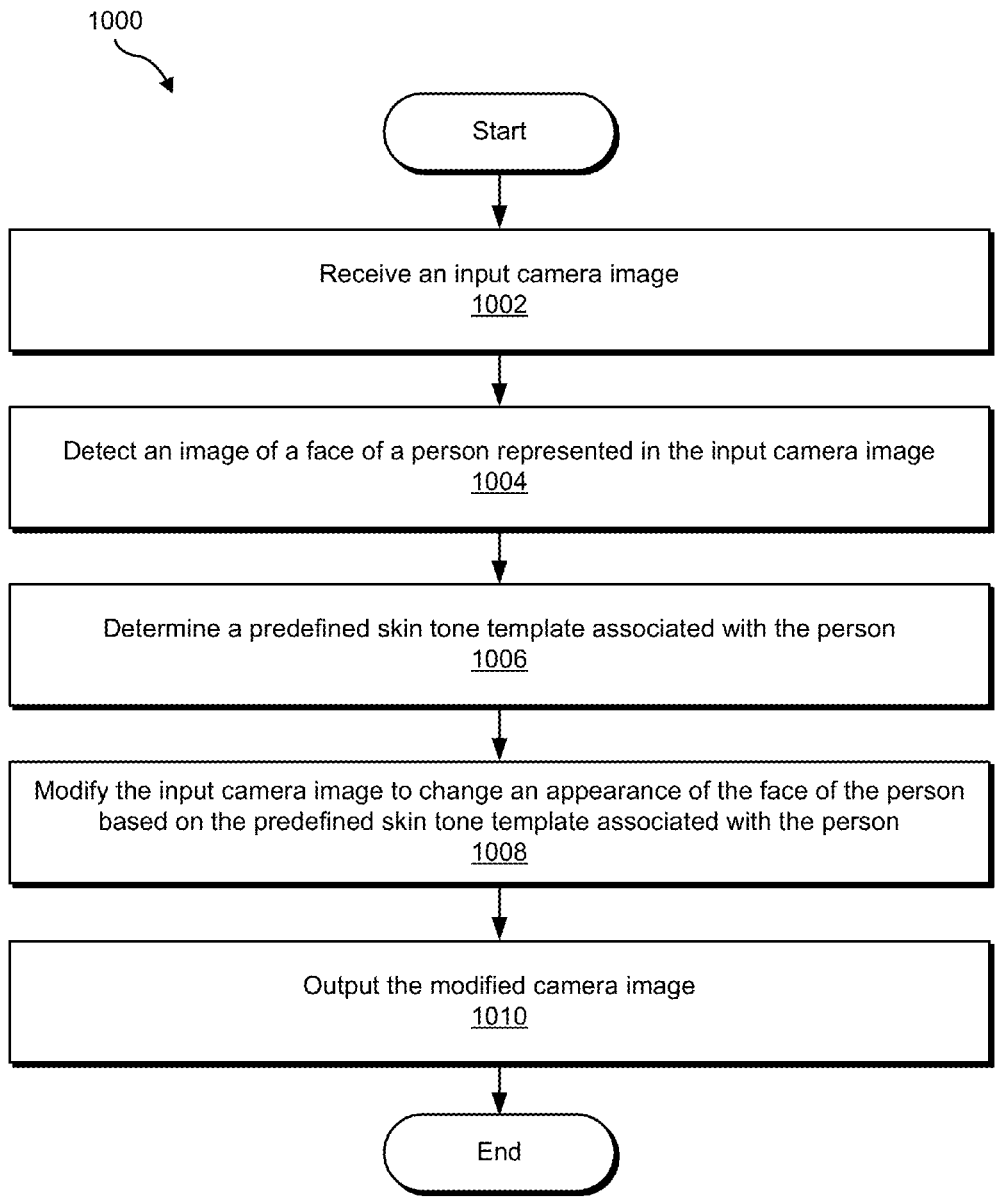

FIGS. 9-10 illustrate exemplary image calibration methods according to principles described herein. While FIGS. 9-10 illustrate exemplary steps of exemplary methods according to one embodiment, other embodiments may omit, add to, reorder, combine, and/or modify any of the steps shown in FIGS. 9-10. The steps shown in FIGS. 9-10 may be performed by any component or combination of components of system 100 and/or one or more devices implementing system 100.

Referring to a method 900 shown in FIG. 9, in step 902, system 100 receives a calibration camera image (e.g., calibration camera image 202), such as described herein.

In step 904, system 100 detects a user request to create a skin tone template. For example, system 100 may detect user input requesting that a skin tone template (e.g., skin tone template 206) for a person be created based on the calibration camera image received in step 902, such as described herein.

In step 906, system 100 generates a skin tone template, such as described herein. For example, system 100 may generate, in response to the user request detected in step 904, the skin tone template for the person based on the calibration camera image received in step 902 by obtaining image data for one or more regions of the image of the face of the person included in calibration camera image from the calibration camera image and storing the image data in the skin tone template.

In step 908, system 100 stores data representative of the skin tone template, such as described herein. Accordingly, the generated skin tone template is available for use by system 100 to automatically calibrate one or more other camera images that include images representing the person.

Referring now to a method 1000 shown in FIG. 10, in step 1002, system 100 receives an input camera image, such as described herein.

In step 1004, system 100 detects an image of a face of a person represented in the input camera image, such as described herein.

In step 1006, system 100 determines a predefined skin tone template associated with the person. The predefined skin tone template may be determined in any of the ways described herein, including by system 100 using one or more facial detection and/or recognition technologies to identify the person represented in the input camera image and the predefined skin tone template associated with the person.

In step 1008, system 100 modifies the input camera image to change an appearance of the image of the face of the person based on the predefined skin tone template associated with the person. System 100 may modify the input camera image based on the skin tone template in any of the ways described herein.

In step 1008, system 100 outputs the modified camera image (e.g., calibrated camera image 708). System 100 may output the modified camera image in any suitable way, including by displaying, publishing, sharing, and/or sending the modified camera image, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
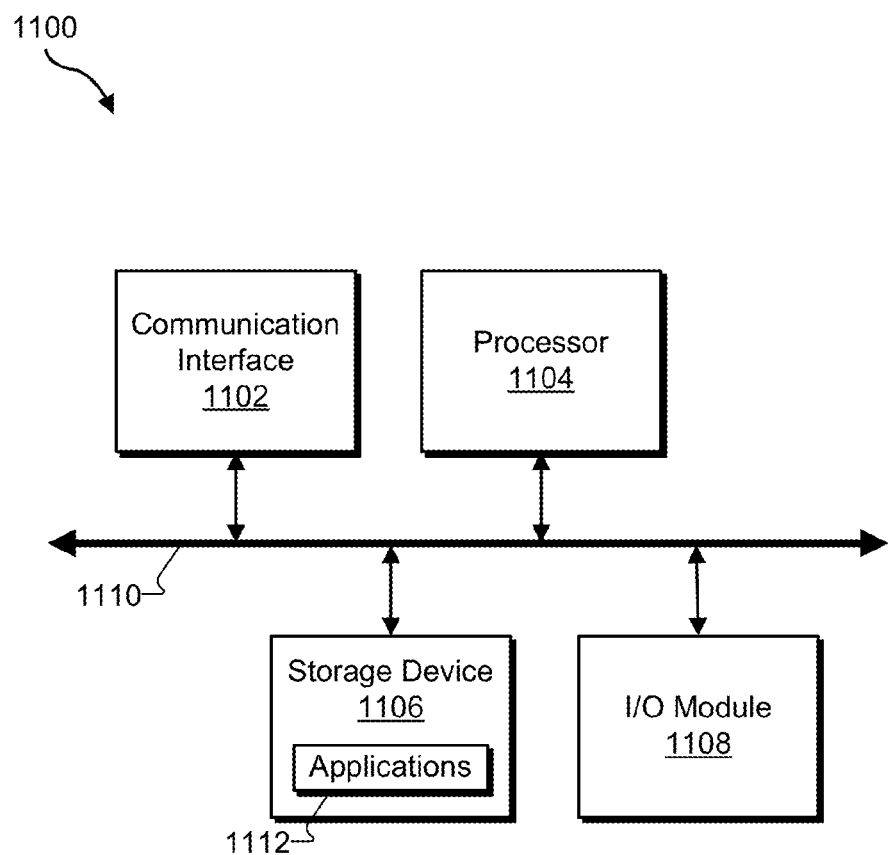
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a communications medium interface, a modem, and any other suitable interface. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with interface facility 102 and/or calibration facility 104. Likewise, storage facility 106 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by an image calibration system, data representative of an input camera image;
   detecting, by the image calibration system, a face of a person represented in the input camera image;
   determining, by the image calibration system, a predefined skin tone template that includes data indicating a tonal range and a tonal distribution for each of a plurality of skin tone regions of the face of the person, the tonal range and the tonal distribution collectively representing a preferred set of skin features of the person;
   modifying, by the image calibration system, the input camera image to change an appearance of the face of the person in the input camera image by changing the plurality of skin tone regions of the face of the person represented in the input camera image based on the data indicating the tonal range and the tonal distribution included in the predefined skin tone template;
   outputting, by the image calibration system, the modified camera image for display, the modified camera image comprising video content output in real time, the modified camera image being output for display as part of a mirror application running on a camera device;
   providing, by the mirror application, a user selectable option to toggle between the modified camera image and the input camera image; and
   overlaying, by the mirror application, a makeup guide template on the display of the modified camera image;
   wherein the makeup guide template provides a preferred makeup representation of at least one region of the face of the person in accordance with the predefined skin tone template, the makeup guide template providing a visual aid to guide the person in an actual application of makeup to the face of the person.

2. The method of claim 1, further comprising generating, by the image calibration system, the predefined skin tone template based on a calibration camera image that includes an image of the face of the person.

3. The method of claim 2, wherein the generating of the predefined skin tone template comprises:
   receiving a user request to create the predefined skin tone template for the person based on the calibration camera image that includes the image of the face of the person; and
   extracting image data for each of the plurality of skin tone regions of the face of the person from the calibration camera image and storing the image data in the predefined skin tone template.

4. The method of claim 3, wherein the image data comprises values of pixels that represent skin tones included in each of the plurality of skin tone regions of the face of the person.

5. The method of claim 2, wherein the calibration camera image comprises an unedited camera image captured by a camera in daylight conditions.

6. The method of claim 2, wherein the calibration camera image comprises an edited camera image in which image data for at least one of the plurality of skin tone regions of the face of the person has been manually edited.

7. The method of claim 1, wherein the determining of the predefined skin tone template associated with the person comprises:
   using facial recognition technology to identify the person based on an image of the face of the person represented in the input camera image; and
   identifying the predefined skin tone template associated with the person based on the identification of the person.

8. The method of claim 1, wherein the modifying of the input camera image comprises modifying data representative of an image of the face of the person in the input camera image based on the predefined skin tone template associated with the person.

9. The method of claim 1, wherein the modifying of the input camera image comprises modifying values of pixels included in the plurality of skin tone regions of the face of the person represented in the input camera image based on the predefined skin tone template.

10. The method of claim 9, wherein the modifying of the values of the pixels included in the one or more skin tone regions of the face of the person represented in the input camera image comprises modifying brightness values of the pixels included in the plurality of skin tone regions of the face of the person represented in the input camera image.

11. The method of claim 1, wherein the modifying of the input camera image comprises shifting, broadening, or narrowing the tonal range of an image of the face of the person represented in the input camera image.

12. The method of claim 1, wherein the modifying of the input camera image comprises changing the tonal distribution of an image of the face of the person represented in the input camera image.

13. The method of claim 1, embodied as computer-executable instructions on at least one non-transitory computer-readable medium.

14. A method comprising:
   receiving, by an image calibration system, data representative of a calibration camera image that includes an image of a face of a person;
   detecting, by the image calibration system, a user request to create a skin tone template for the person based on the calibration camera image;

generating, by the image calibration system in response to the user request, the skin tone template for the person based on the calibration camera image, the skin tone template including data indicating a tonal range and a tonal distribution for each of a plurality of skin tone regions of the face of the person, the tonal range and the tonal distribution collectively representing a preferred set of skin features of the person, the skin tone template generated by obtaining the data indicating the tonal range and the tonal distribution for each of the plurality of skin tone regions of the face of the person from the calibration camera image and storing the data in the skin tone template;

receiving, by the image calibration system, data representative of an input camera image;

detecting, by the image calibration system, an image of the face of the person in the input camera image;

identifying, by the image calibration system, the person from the image of the face of the person in the input camera image;

accessing, by the image calibration system, the skin tone template for the person;

modifying, by the image calibration system, data representative of the image of the face of the person in the input camera image by changing the plurality of skin tone regions of the face of the person represented in the input camera image based on the data indicating the tonal range and the tonal distribution included in the skin tone template for the person to produce a calibrated camera image;

outputting, by the image calibration system, the calibrated camera image for display, the calibrated camera image comprising video content output in real time, the calibrated camera image being output for display as part of a mirror application running on a camera device;

providing, by the mirror application, a user selectable option to toggle between the calibrated camera image and the input camera image; and overlaying, by the mirror application, a makeup guide template on the display of the calibrated camera image;

wherein the makeup guide template provides a preferred makeup representation of at least one region of the face of the person in accordance with the predefined skin tone template, the makeup guide template providing a visual aid to guide the person in an actual application of makeup to the face of the person.

15. The method of claim 14, embodied as computer-executable instructions on at least one non-transitory computer-readable medium.

16. A system comprising:
a processor;
a skin tone calibration facility that directs the processor to:
detect an image of a face of a person in a camera image,
determine a predefined skin tone template associated with the person, the pre-defined skin tone template including data indicating a tonal range and a tonal distribution for each of a plurality of skin tone regions of the face of the person, the tonal range and the tonal distribution collectively representing a preferred set of skin features of the person, and
modify data representative of the image of the face of the person in the camera image by changing the plurality of skin tone regions of the face of the person represented in the input camera image based on the data indicating the tonal range and the tonal distribution included in predefined skin tone template; and
a mirror application that directs the processor to:
output the modified data for display, the modified data comprising video content output in real time,
provide a user selectable option to toggle between the modified data and the camera image, and
overlay a makeup guide template on the display of the modified data,
wherein the makeup guide template provides a preferred makeup representation of at least one region of the face of the person in accordance with the predefined skin tone template, the makeup guide template providing a visual aid to guide the person in an actual application of makeup to the face of the person.

17. The system of claim 16, wherein the modification of the data representative of the image of the face of the person changes a skin tone attribute of the face of the person based on the predefined skin tone template.

18. The system of claim 16, wherein the modification of the data representative of the image of the face of the person changes brightness values of pixels included in the image of the face of the person in the camera image based on the predefined skin tone template.

* * * * *